US009714758B2

(12) United States Patent
Li

(10) Patent No.: US 9,714,758 B2
(45) Date of Patent: Jul. 25, 2017

(54) LED LAMP

(71) Applicant: Zhejiang Yankon Group Co., Ltd., Shangyu (CN)

(72) Inventor: Yang Li, Shangyu (CN)

(73) Assignee: ZHEJIANG YANKON GROUP CO., LTD., Shangyu (CN)

( * ) Notice: Subject to any disclaimer, the term of this patent is extended or adjusted under 35 U.S.C. 154(b) by 540 days.

(21) Appl. No.: 14/329,981

(22) Filed: Jul. 13, 2014

(65) Prior Publication Data

US 2015/0159851 A1 Jun. 11, 2015

(30) Foreign Application Priority Data

Dec. 9, 2013 (CN) .......................... 2013 1 0660589

(51) Int. Cl.

| | |
|---|---|
| ***H02H 9/00*** | (2006.01) |
| ***F21V 23/00*** | (2015.01) |
| ***F21K 9/233*** | (2016.01) |
| *F21V 23/02* | (2006.01) |
| *F21V 29/51* | (2015.01) |
| *F21V 29/67* | (2015.01) |
| *F21Y 115/10* | (2016.01) |

(52) U.S. Cl.
CPC ............ *F21V 23/009* (2013.01); *F21K 9/233* (2016.08); *F21V 23/023* (2013.01); *F21V 29/51* (2015.01); *F21V 29/673* (2015.01); *F21Y 2115/10* (2016.08)

(58) Field of Classification Search
CPC ..................................................... F21V 23/009
USPC ........................................................ 361/91.1
See application file for complete search history.

(56) References Cited

U.S. PATENT DOCUMENTS

2012/0218757 A1* 8/2012 Gill ....................... F21V 15/015
362/235

* cited by examiner

*Primary Examiner* — Stephen W Jackson
(74) *Attorney, Agent, or Firm* — Matthias Scholl, PC; Matthias Scholl

(57) ABSTRACT

An LED lamp including: a lamp holder; a housing; a lamp house; a power supply assembly; an LED light source assembly; a heat radiation assembly. The housing includes a wall, a chamber, and an opening. The lamp holder is in fixed connection to the housing. The power supply assembly is disposed in the chamber of the housing. The LED light source assembly and the heat radiation assembly are disposed in the lamp house. The wall of the housing includes a plurality of first air vents. A clamping plate is disposed between the power supply assembly and the lamp house, and the lamp house is connected to the opening of the housing via the clamping plate. The lamp house includes a vent hole.

9 Claims, 6 Drawing Sheets

LED LAMP

CROSS-REFERENCE TO RELATED APPLICATIONS

Pursuant to 35 U.S.C. §119 and the Paris Convention Treaty, this application claims the benefit of Chinese Patent Application No. 201310660589.3 filed Dec. 9, 2013, the contents of which, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

Field of the Invention

The invention relates to an LED lamp.

Description of the Related Art

A typical mining lamp employs a metal halide lamp as a light source. However, the metal halide lamp has a high light decay rate and short service life, and the power module of the metal halide lamp employs an inductive transformer for feeding. When abnormal load voltage occurs, the inductive transformer generates a high voltage, which causes hidden danger.

Due to poor heat dissipation performance and the restrictions of size and weight, conventional LED lamps generally include only one integrated light source, and thus the power thereof is no more than 150 W. High power of light and power source modules in the conventional LED lamps are apt to burn out. In addition, the power module of the LED lamps also employs an inductive transformer for feeding, which brings about security risks.

SUMMARY OF THE INVENTION

In view of the above-described problems, it is one objective of the invention to provide an LED lamp that has large power, good heat dissipation effect, and high security.

To achieve the above objective, in accordance with one embodiment of the invention, there is provided an LED lamp comprising: a lamp holder; a housing, the housing comprising a wall, a chamber, and an opening; a lamp house; a power supply assembly; an LED light source assembly; a heat radiation assembly. The lamp holder is in fixed connection to the housing. The power supply assembly is disposed in the chamber of the housing. The LED light source assembly and the heat radiation assembly are disposed in the lamp house. The wall of the housing comprises a plurality of first air vents; a clamping plate is disposed between the power supply assembly and the lamp house, and the lamp house is connected to the opening of the housing via the clamping plate; and the lamp house comprises a vent hole.

In a class of this embodiment, the clamping plate comprises a plurality of second air vents communicating with external ambience and the chamber of the housing; at least two isolation columns are disposed at a surface of the clamping plate so that an air isolation layer is formed between the clamping plate and the lamp house. The lamp house is in fixed connection to the isolation columns, and the LED light source assembly is in electric connection to the power supply assembly via a power line. The heat produced by the power supply assembly is discharged via the second air vents and enters the air isolation layer. The arrangement of the air isolation layer prevents the accumulation of the heat from the power supply assembly and from the LED light source assembly, thereby improving the heat radiating effect.

In a class of this embodiment, the lamp house comprises a main body and a head cover. The main body is fixedly disposed on the isolation columns and is in connection to the head cover. The vent hole of the lamp house comprises a first vent hole disposed on a sidewall of the main body, a second vent hole disposed at a bottom of the main body, and a third vent hole disposed on the head cover; and the first vent hole, the second vent hole, and the third vent hole all communicate with the external ambience.

In a class of this embodiment, the heat radiation assembly comprises a heat radiation module and two groups of directional radiation members. The heat radiation module comprises a fan, a heat pipe radiator, and a supporting structure; a bottom of the fan is connected to an inner bottom of the main body, and a top of the fan is connected to a bottom of the supporting structure. The heat pipe radiator is fixed in the supporting structure. The heat pipe radiator is connected to the LED light source assembly. Each of the directional radiation members comprises a duct cover, a press plate, and a radiation mesh. The duct cover is connected to an inner bottom of the main body; a bottom edge of the duct cover is connected to a side bottom of the supporting structure. The press plate is connected to an inner wall of the head cover. The radiation mesh is pressed between the press plate and the head cover. The press plate and the radiation mesh are disposed in a cavity of the duct cover. The press plate comprises air vents communicating with the third vent hole of the head cover; and heat emitted from the heat pipe radiator is guided by the cavity of the duct cover and discharged from the third vent hole of the head cover.

In a class of this embodiment, the power supply assembly comprises a power supply, a power supply shield, and a protective aluminum sheet. The power supply shield is fixed on the clamping plate. The power supply is disposed in the power supply shield. The protective aluminum sheet is disposed between the power supply and the clamping plate and is fixed on the clamping plate using a screw; and the protective aluminum sheet comprises a third air vent. The power supply shield and the protective aluminum sheet can prevent the electric spark produced by the power supply from damaging the housing and the clamping plate, thereby improving the security of the large power of LED lamp.

In a class of this embodiment, the power supply comprises a power driver module and an overvoltage protection module; an input end of the power driver module is in electric connection to the lamp holder via a live wire and a zero wire; and an output end of the power driver module is connected to an input end of the overvoltage protection module. The arrangement of the overvoltage protection module improves the security of the large power of LED lamp.

In a class of this embodiment, the overvoltage protection module comprises a primary overvoltage protection module, a secondary overvoltage protection module, a fourth resistor, a fifth resistor, a sixth resistor, a fifth capacitor, an electrolytic capacitor, a NMOS transistor, a silicon controlled rectifier, a first power resistor, a second power resistor, and a temperature insurance resistor. A current signal output end of the primary overvoltage protection module is connected to a first output end of the power driver module, one end of the fourth resistor, a current signal output end of the secondary overvoltage protection module, one end of the first power resistor, and one end of the second power resistor. A current signal input end of the primary overvoltage protection module is connected to a positive electrode of the electrolytic capacitor, one end of the fifth resistor, and a gate electrode of the NMOS transistor. A negative electrode of the electrolytic capacitor is grounded. The negative electrode of the electrolytic capacitor is connected to a second output end of the power driver module, another end of the fifth resistor, one end of the sixth resistor, one end of the fifth capacitor, and a cathode of the silicon controlled rectifier. A drain electrode of the NMOS transistor is connected to another end of the fourth resistor. A source electrode of the NMOS transistor is connected to another end of the sixth resistor, another end of the fifth capacitor, a current signal input end of the secondary overvoltage protection module, and a control pole of the silicon controlled rectifier; an anode of the silicon controlled rectifier is connected to another end of the first power resistor and another end of the second power resistor; one end of the temperature insurance resistor is connected to the lamp holder via the live wire, and another end of the temperature insurance resistor is connected to an input end of the power driver module; and the temperature insurance resistor is disposed between the first power resistor and the second power resistor.

In a class of this embodiment, the primary overvoltage protection module comprises a second voltage regulator tube and a third voltage regulator tube; a negative electrode of the second voltage regulator tube is connected to one end of the fourth resistor; a positive electrode of the second voltage regulator tube is connected to a negative electrode of the third voltage regulator tube; a positive electrode of the third voltage regulator tube is connected to one end of the fifth resistor. The secondary overvoltage protection module comprises a fourth voltage regulator tube and a fifth voltage regulator tube; a negative electrode of the fourth voltage regulator tube is connected to one end of the fourth resistor; a positive electrode of the fourth voltage regulator tube is connected to a negative electrode of the fifth voltage regulator tube; a positive electrode of the fifth voltage regulator tube is connected to another end of the fifth capacitor.

In a class of this embodiment, the lamp holder is an E39-type lamp holder.

In a class of this embodiment, the LED light source assembly comprises a COB (Chip-On-Board) light source and a lens. The lens is fixed on a top end surface of the COB light source, and a bottom of the COB light source leans against a top end surface of the heat pipe radiator.

Advantages of embodiments of the invention are summarized below. By means of the heat radiation assembly, the heat produced by the LED light source assembly is discharged from the vent holes of the lamp house into the external ambience. The heat radiation is very rapid and highly efficiently. The power supply assembly is separated from the lamp house by the clamping plate, and thus the heat produced by the power supply assembly is directly discharged into the external air via the first air vents. The heat from the power supply assembly and the heat from the LED light source assembly do not accumulate with each other, thereby improving the heat radiating effect and the security of the LED lamp.

DETAILED DESCRIPTION OF THE EMBODIMENTS

For further illustrating the invention, experiments detailing an LED lamp are described below. It should be noted that the following examples are intended to describe and not to limit the invention.

Figure 1:
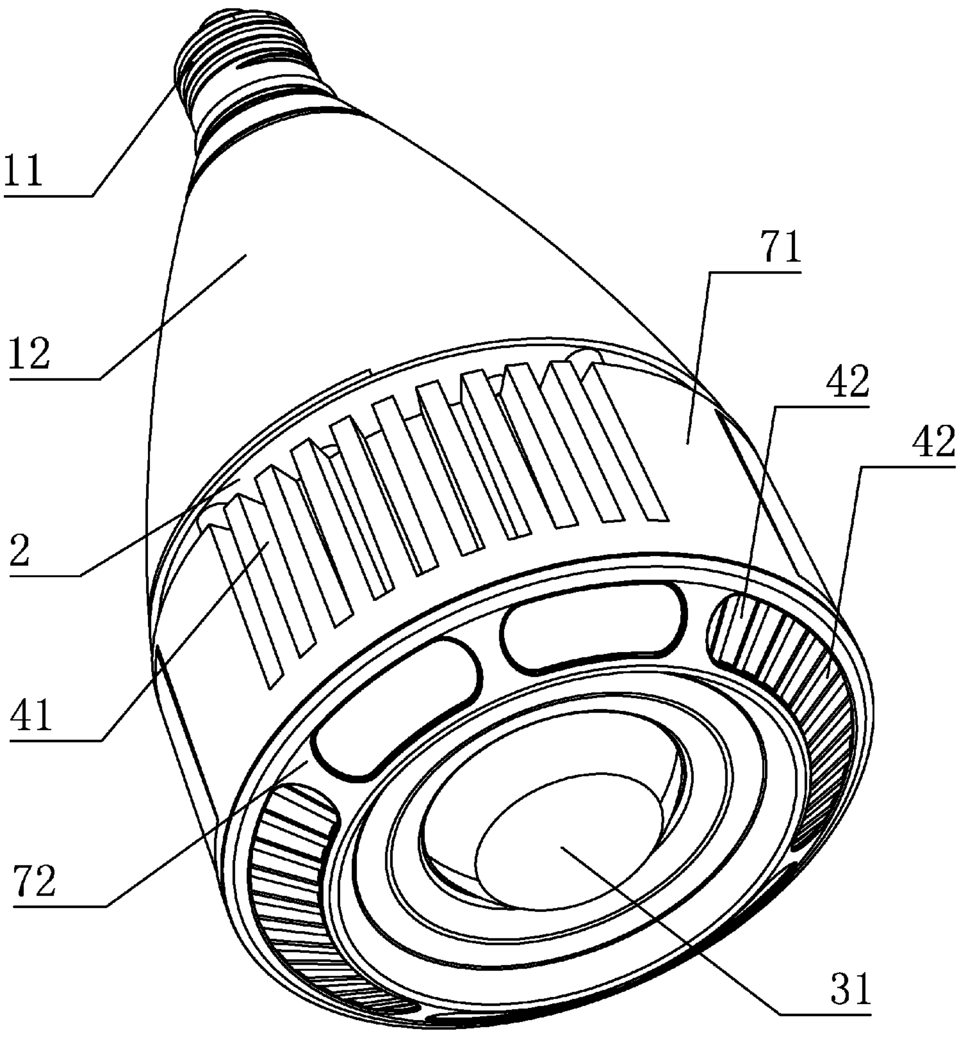
FIG. 1 is a stereogram of an LED lamp according to one embodiment of the invention.
Figure 2:
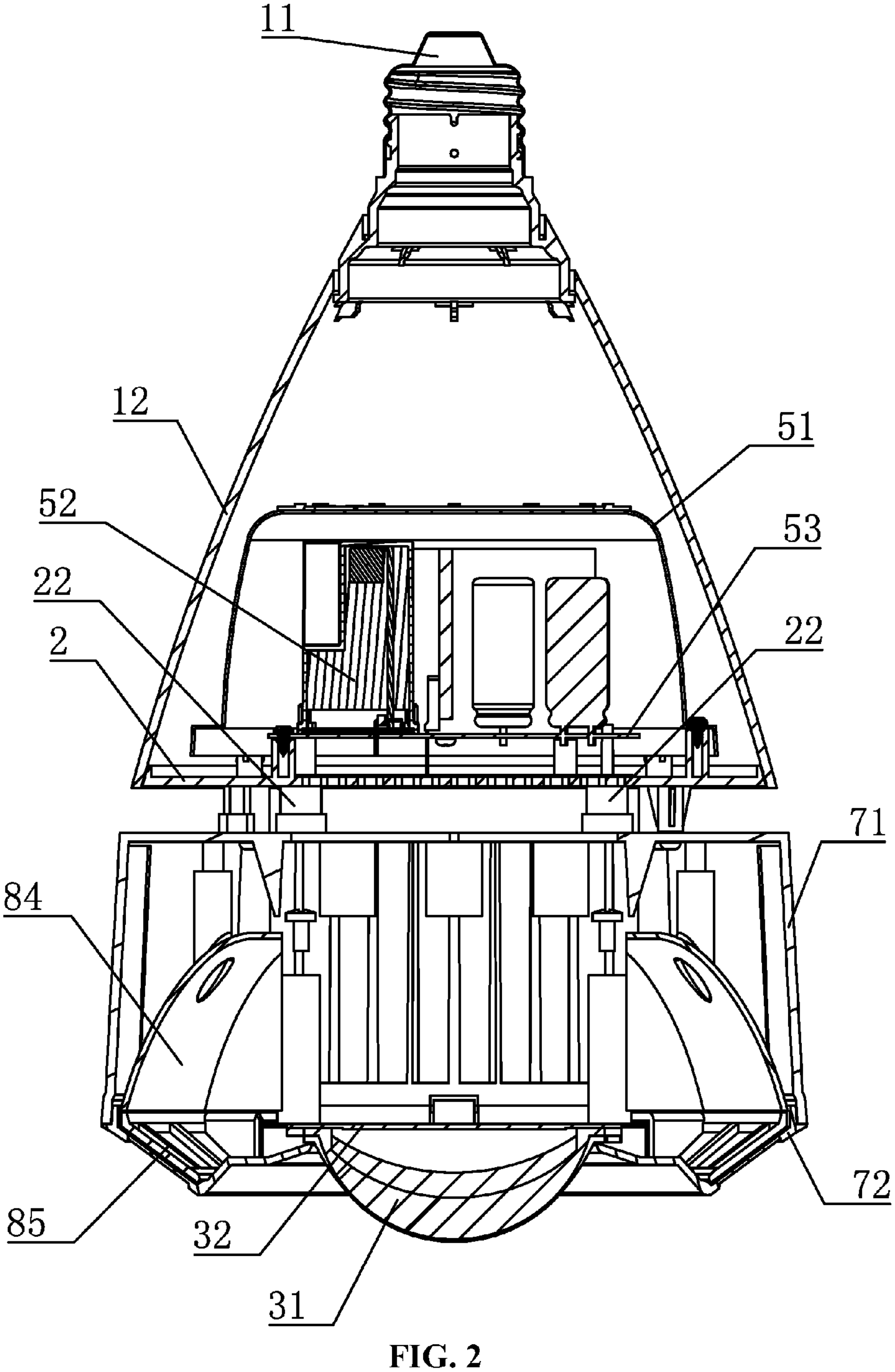
FIG. 2 is a cross sectional view of an LED lamp according to one embodiment of the invention.
Figure 3:
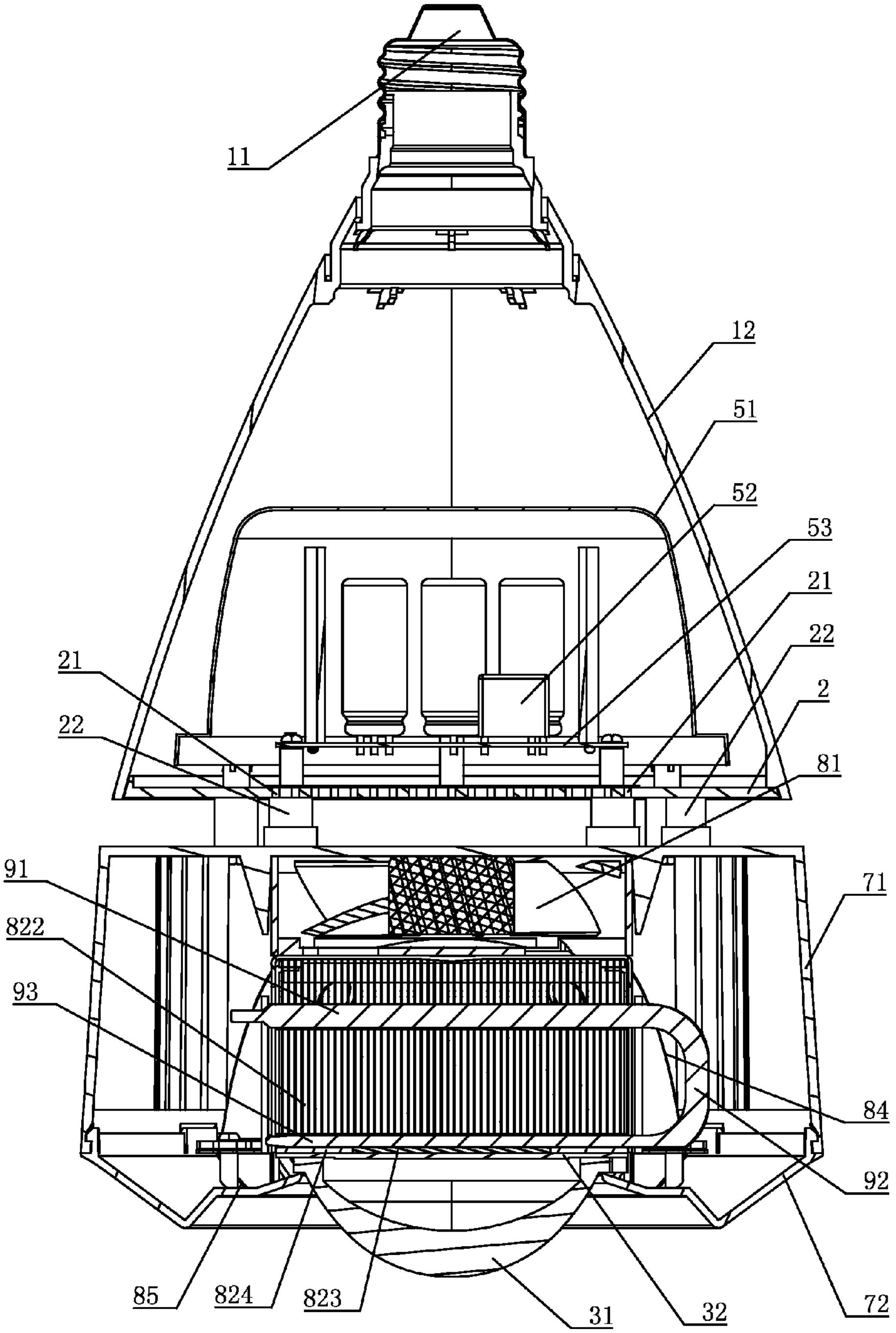
FIG. 3 is another cross sectional view of an LED lamp according to one embodiment of the invention.
Figure 4:
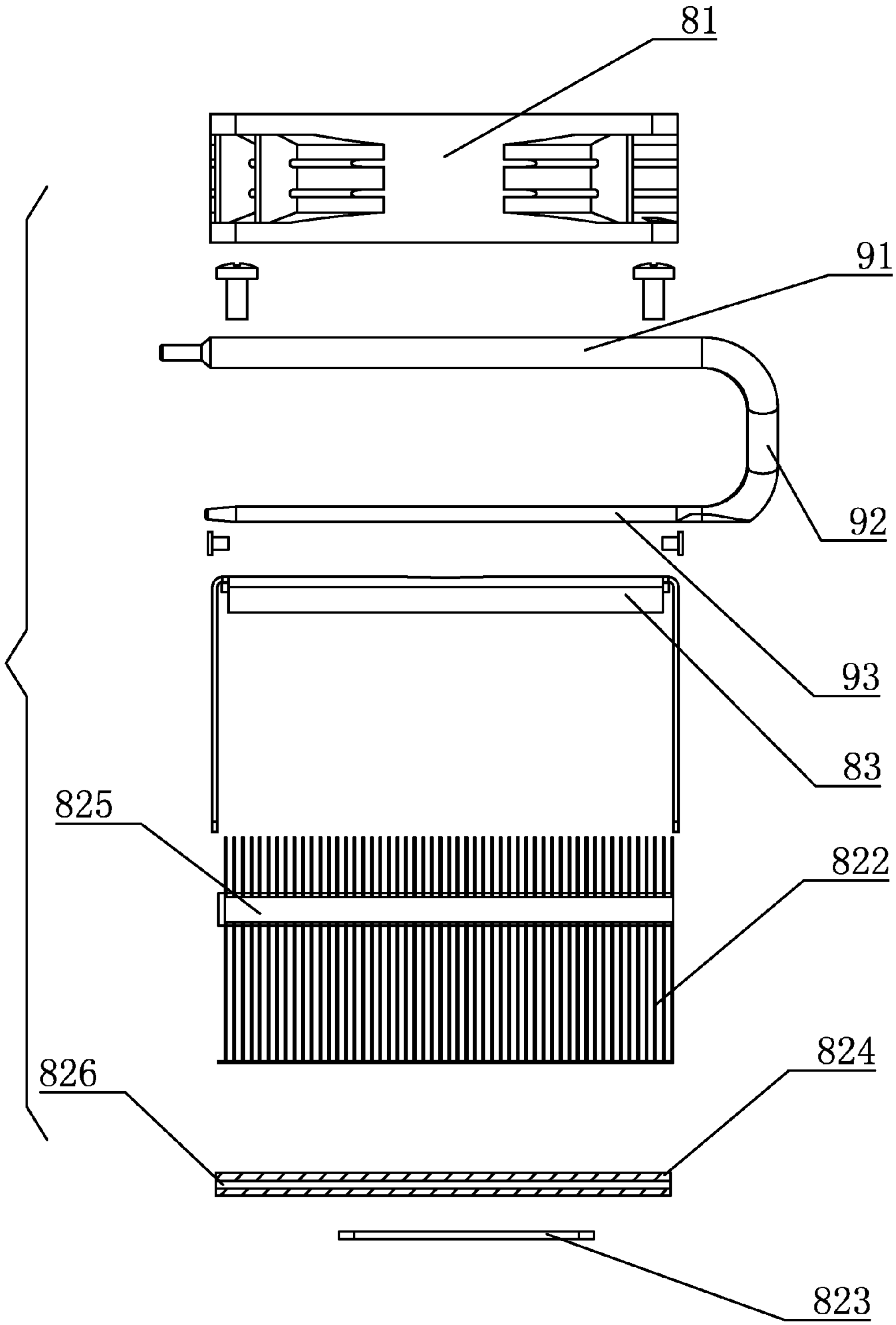
FIG. 4 is an exploded view of a heat radiation assembly of an LED lamp according to one embodiment of the invention.
Figure 5:
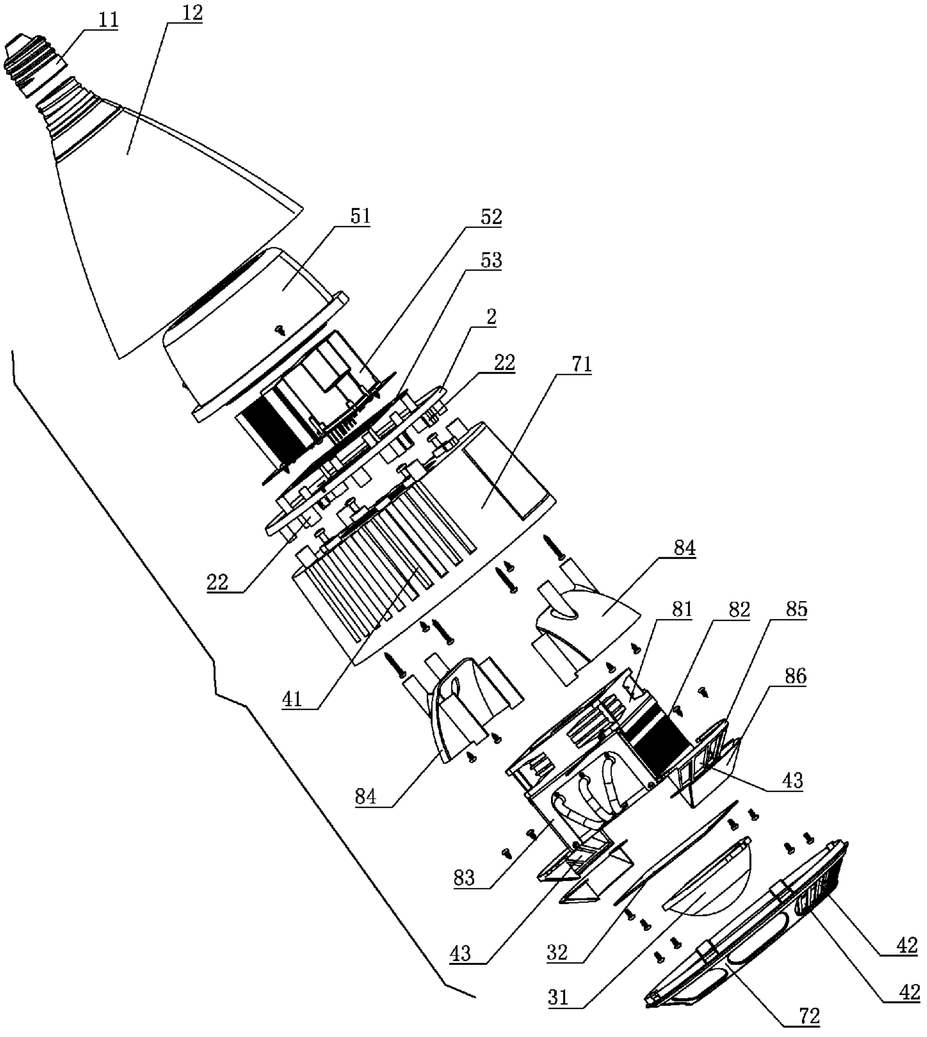
FIG. 5 is an exploded view of an LED lamp according to one embodiment of the invention.
Figure 6:
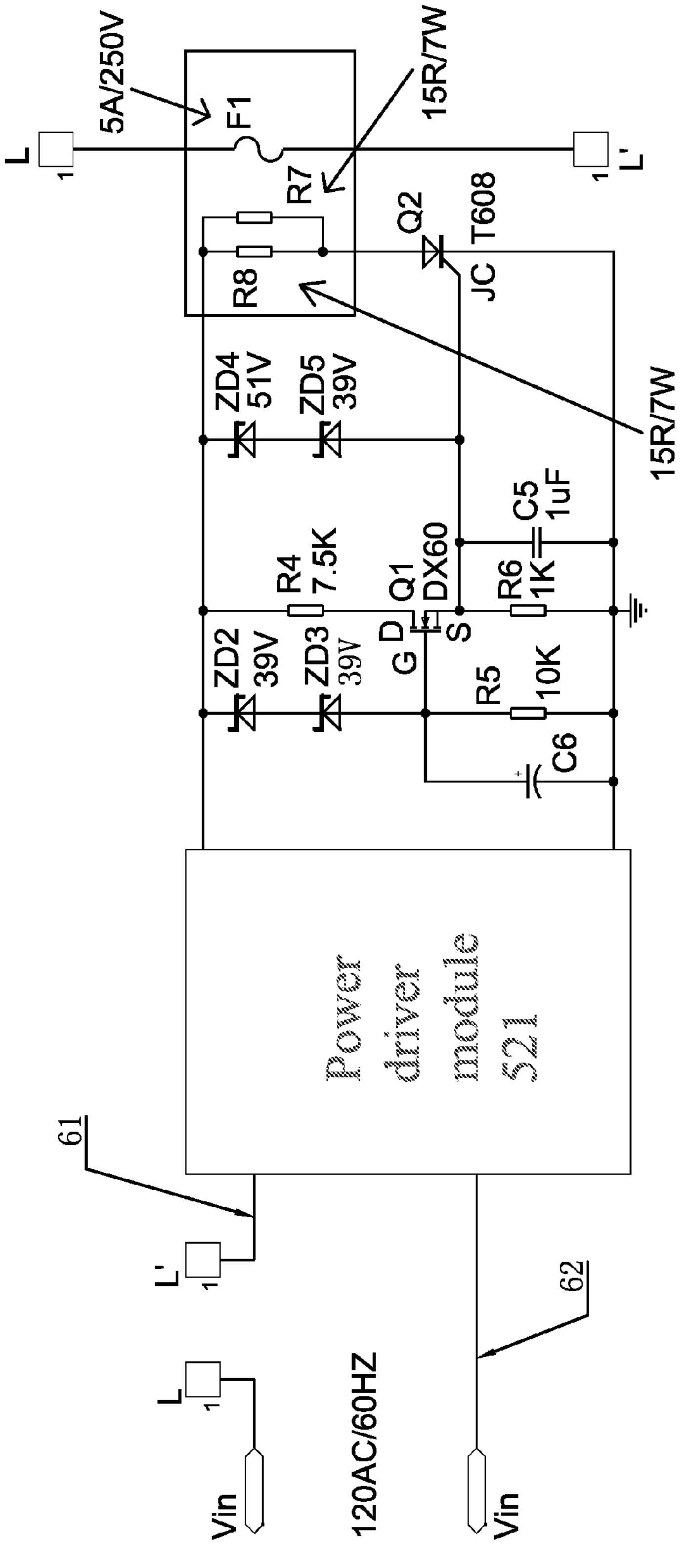
FIG. 6 is a circuit diagram of a power supply of an LED lamp according to one embodiment of the invention.

As shown in FIGS. 1-6, an LED lamp comprises: an E39-type lamp holder 11; a housing 12; a lamp house; a power supply assembly; an LED light source assembly; a heat radiation assembly. The housing comprises a wall, a chamber, and an opening. The E39-type lamp holder 11 is in fixed connection to the housing 12. The power supply assembly is disposed in the chamber of the housing 12. The LED light source assembly and the heat radiation assembly are disposed in the lamp house 12. The wall of the housing comprises a plurality of first air vents (not shown in FIGS). A clamping plate 2 is disposed between the power supply assembly and the lamp house, and the lamp house is connected to the opening of the housing 12 via the clamping plate 2. The clamping plate 2 comprises a plurality of second air vents 21 communicating with external ambience and the chamber of the housing. At least two isolation columns 22 are disposed at a surface of the clamping plate so that an air isolation layer is formed between the clamping plate 2 and the lamp house. The lamp house is in fixed connection to the isolation columns 22. The lamp house comprises a vent hole. The LED light source assembly comprises a COB (Chip-On-Board) light source 32 and a lens 31. The COB light source 32 is in electric connection to the power supply assembly via a power line. The COB light source 32 is disposed at the top of the heat radiation assembly. The lens 31 is fixed on the top end of the COB light source 32.

The power supply assembly comprises a power supply 52, a power supply shield 51, and a protective aluminum sheet 53. The power supply shield 51 is fixed on the clamping plate 2. The power supply 52 is disposed in the power supply shield 51. The protective aluminum sheet 53 is disposed between the power supply 52 and the clamping plate 2 and is fixed on the clamping plate 2 using a screw. The protective aluminum sheet 53 comprises a third air vent (not shown in FIGS.).

The power supply 52 comprises a power driver module and an overvoltage protection module. An input end of the power driver module is in electric connection to the E39-type lamp holder 11 via a live wire 61 and a zero wire 62, and an output end of the power driver module is connected to an input end of the overvoltage protection module. The overvoltage protection module comprises a primary overvoltage protection module, a secondary overvoltage protection module, a fourth resistor R4, a fifth resistor R5, a sixth resistor R6, a fifth capacitor C5, an electrolytic capacitor C6, a NMOS transistor Q1, a silicon controlled rectifier Q2, a first power resistor R7, a second power resistor R8, and a temperature insurance resistor F1. The primary overvoltage protection module comprises a second voltage regulator tube ZD2 and a third voltage regulator tube ZD3. The secondary overvoltage protection module comprises a fourth voltage regulator tube ZD4 and a fifth voltage regulator tube ZD5.

A negative electrode of the second voltage regulator tube ZD2 is connected to the output end of the power driver module, one end of the fourth resistor R4, a negative electrode of the fourth voltage regulator tube ZD4, one end of the first power resistor R7, and one end of the second power resistor R8. A positive electrode of the second voltage regulator tube ZD2 is connected to a negative electrode of the third voltage regulator tube ZD3; a positive electrode of the third voltage regulator tube ZD3 is connected to a positive electrode of the electrolytic capacitor C6, one end of the fifth resistor R5, and a gate electrode of the NMOS transistor Q1. A negative electrode of the electrolytic capacitor C6 is grounded. The negative electrode of the electrolytic capacitor C6 is connected to a second output end of the power driver module, another end of the fifth resistor R5, one end of the sixth resistor R6, one end of the fifth capacitor C5, and a cathode of the silicon controlled rectifier Q2; a drain electrode of the NMOS transistor Q1 is connected to another end of the fourth resistor R4; a source electrode of the NMOS transistor Q1 is connected to another end of the sixth resistor R6, another end of the fifth capacitor C5, a positive electrode of the fifth voltage regulator tube ZD5, and a control pole of the silicon controlled rectifier Q2. A negative electrode of the fifth voltage regulator tube ZD5 is connected to a positive electrode of the fourth voltage regulator tube ZD4. An anode of the silicon controlled rectifier Q2 is connected to another end of the first power resistor R7 and another end of the second power resistor R8; one end of the temperature insurance resistor F1 is connected to the E39-type lamp holder 11 via the live wire 61, and another end of the temperature insurance resistor F1 is connected to an input end of the power driver module via the live wire 61. The temperature insurance resistor F1 is disposed between the first power resistor R7 and the second power resistor R8.

The lamp house comprises a main body 71 and a head cover 72. The main body 71 is fixedly disposed on the isolation columns 22 and is in connection to the head cover 72. The vent hole of the lamp house comprises a first vent hole 41 disposed on a sidewall of the main body 71, a second vent hole disposed at a bottom of the main body 71, and a third vent hole 42 disposed on the head cover 72; and the first vent hole 41, the second vent hole, and the third vent hole 42 all communicate with the external ambience.

The heat radiation assembly comprises a heat radiation module and two groups of directional radiation members. The heat radiation module comprises a fan 81, a heat pipe radiator 82, and a supporting structure 83; a bottom of the fan 81 is connected to an inner bottom of the main body 71, and a top of the fan 81 is connected to a bottom of the supporting structure 83. The heat pipe radiator 82 is fixed in the supporting structure 83. The heat pipe radiator 82 is connected to the COB light source 32; each of the directional radiation members comprises a duct cover 84, a press plate 85, and a radiation mesh 86. The duct cover 84 is connected to an inner bottom of the main body 71; a bottom edge of the duct cover 84 is connected to a side bottom of the supporting structure 83. The press plate 85 is connected to an inner wall of the head cover 72. The radiation mesh 86 is pressed between the press plate 85 and the head cover 72. The press plate 85 and the radiation mesh 86 are disposed in a cavity of the duct cover 84. The press plate 85 comprises air vents 43 communicating with the third vent hole of the head cover; and heat emitted from the heat pipe radiator 82 is guided by the cavity of the duct cover 84 and discharged from the third vent hole 42 of the head cover.

The heat pipe radiator 82 comprises three copper heat pipes, a heat sink combination 822, a copper insert 823, and a base 824. The top of the heat sink combination 822 is fixedly connected to the fan 81, and the bottom of the heat sink combination 822 is fixedly connected to the base 824. The copper insert 823 is in fixed connection to the bottom of the base 824. Three through-type first heat-transfer holes 825 are disposed between the front face and the rear face of the heat sink combination 822 to receive the three copper heat pipes. Three through-type second heat-transfer holes 826 corresponding to the three through-type first heat-transfer holes 825 are disposed on the base 824. Each of the copper heat pipes comprises a first heat-transfer part 91, a connection part 92, and a second heat-transfer part 93. The first heat-transfer part 91 passes through the first heat-transfer hole 825. One end of the connection part 92 bends inward to connect to one end of the first heat-transfer part 91. The connection part 92 is arranged on the front end of the heat sink combination 822. One end of the second heat-transfer part 93 bends inward to connect to the other end of the connection part 92. The second heat-transfer part 93 passes through the second heat-transfer hole 826. The duct cover 84 in one group of directional radiation member nests the left lateral of the heat sink combination 822, and the duct cover 84 in the other group of directional radiation member nests the right lateral of the heat sink combination 822. The bottom of the COB light source 32 leans against the top surface of the copper insert 823.

The fan 81 draws in external air from the second vent hole disposed at the bottom of the main body, and delivers wind to the COB light source 32 to disperse heat. Thus, on one hand, the air between the bottom of the main body 71 and the clamping plate 2 is driven to flow to the top of the main body 71 along the cavity of the duct cover 84, and then is discharged from the first vent hole 41 disposed on the sidewall of the main body 71, which facilitates the dissipation of the heat produced by the power supply 52. On the other hand, the heat produced by the COB light source 32 flows to the head cover 72 along the interior of the directional radiation member, and then is released to the external air through the third vent hole disposed on the head cover 72.

The LED lamp has good heat radiation effect, and the COB light source 32 involved therein has a voltage up to between 60 and 100 V, the current can reach between 2.5 and 2.8 A, and the power can be up to 250 W. Thus, the lamp can meet the high luminous flux requirement.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. An LED lamp, comprising:

a) a lamp holder;

b) a housing, the housing comprising a wall, a chamber, and an opening;

and the wall comprising a plurality of first air vents;

c) a lamp house, the lamp house comprising a vent hole assembly;

d) a power supply assembly;

e) an LED light source assembly;

f) a heat radiation assembly;

g) a clamping plate, the clamping plate comprising a plurality of second air vents for communicating with external ambience and the chamber; and h) at least two isolation columns;

wherein:

the lamp holder is fixedly connected to the housing;

the power supply assembly is disposed in the chamber;

the LED light source assembly and the heat radiation assembly are disposed in the lamp house;

the clamping plate is disposed between the power supply assembly and the lamp house, and the lamp house is connected to the opening via the clamping plate;

the at least two isolation columns are disposed at a surface of the clamping plate so that an air isolation layer is formed between the clamping plate and the lamp house;

the lamp house is fixedly connected to the at least two isolation columns; and the LED light source assembly is in electric connection to the power supply assembly via a power line.

2. The lamp of claim 1, wherein:

the lamp house comprises a main body and a head cover;

the main body is fixedly disposed on the at least two isolation columns and is in connection to the head cover;

the vent hole assembly comprises a first vent hole disposed on a sidewall of the main body, a second vent hole disposed at a bottom of the main body, and a third vent hole disposed on the head cover; and the first vent hole, the second vent hole, and the third vent hole all communicate with the external ambience.

3. The lamp of claim 2, wherein:

the heat radiation assembly comprises a heat radiation module and two directional radiation members;

the heat radiation module comprises a fan, a heat pipe radiator, and a supporting structure; a bottom of the fan is connected to an inner bottom of the main body, and a top of the fan is connected to a bottom of the supporting structure; the heat pipe radiator is fixed in the supporting structure; the heat pipe radiator is connected to the LED light source assembly; and each of the two directional radiation members comprises a duct cover, a press plate, and a radiation mesh; the duct cover is connected to the inner bottom of the main body; a bottom edge of the duct cover is connected to a side bottom of the supporting structure; the press plate is connected to an inner wall of the head cover; the radiation mesh is pressed between the press plate and the head cover; the press plate and the radiation mesh are disposed in a cavity of the duct cover; the press plate comprises a plurality of third air vents communicating with the third vent hole; and heat emitted from the heat pipe radiator is guided by the cavity of the duct cover and discharged from the third vent hole.

4. The lamp of claim 3, wherein:

the power supply assembly comprises a power supply, a power supply shield, and a protective aluminum sheet;

the power supply shield is fixed on the clamping plate;

the power supply is disposed in the power supply shield;

the protective aluminum sheet is disposed between the power supply and the clamping plate and is fixed on the clamping plate using a screw; and the protective aluminum sheet comprises a fourth air vent.

5. The lamp of claim 4, wherein the power supply comprises a power driver module and an overvoltage protection module; an input end of the power driver module is in electric connection to the lamp holder via a live wire and a zero wire; and an output end of the power driver module is connected to an input end of the overvoltage protection module.

6. The lamp of claim 5, wherein:

the overvoltage protection module comprises a primary overvoltage protection module, a secondary overvoltage protection module, a fourth resistor, a fifth resistor, a sixth resistor, a fifth capacitor, an electrolytic capacitor, a NMOS transistor, a silicon controlled rectifier, a first power resistor, a second power resistor, and a temperature insurance resistor;

the output end of the power driver module comprises a first output end of the power driver module and a second output end of the power driver module;

a current signal output end of the primary overvoltage protection module is connected to the first output end of the power driver module, one end of the fourth resistor, a current signal output end of the secondary overvoltage protection module, one end of the first power resistor, and one end of the second power resistor;

a current signal input end of the primary overvoltage protection module is connected to a positive electrode of the electrolytic capacitor, one end of the fifth resistor, and a gate electrode of the NMOS transistor;

a negative electrode of the electrolytic capacitor is grounded; the negative electrode of the electrolytic capacitor is connected to the second output end of the power driver module, another end of the fifth resistor, one end of the sixth resistor, one end of the fifth capacitor, and a cathode of the silicon controlled rectifier;

a drain electrode of the NMOS transistor is connected to another end of the fourth resistor; a source electrode of the NMOS transistor is connected to another end of the sixth resistor, another end of the fifth capacitor, a current signal input end of the secondary overvoltage protection module, and a control pole of the silicon controlled rectifier; an anode of the silicon controlled rectifier is connected to another end of the first power resistor and another end of the second power resistor; and one end of the temperature insurance resistor is connected to the lamp holder via the live wire, and another end of the temperature insurance resistor is connected to an input end of the power driver module; and the temperature insurance resistor is disposed between the first power resistor and the second power resistor.

7. The lamp of claim 6, wherein:

the primary overvoltage protection module comprises a second voltage regulator tube and a third voltage regulator tube; a negative electrode of the second voltage regulator tube is connected to the one end of the fourth resistor; a positive electrode of the second voltage regulator tube is connected to a negative electrode of the third voltage regulator tube; a positive electrode of the third voltage regulator tube is connected to the one end of the fifth resistor; and the secondary overvoltage protection module comprises a fourth voltage regulator tube and a fifth voltage regulator tube; a negative electrode of the fourth voltage regulator tube is connected to the one end of the fourth resistor; a positive electrode of the fourth voltage regulator tube is connected to a negative electrode of the fifth voltage regulator tube; a positive electrode of the fifth voltage regulator tube is connected to the another end of the fifth capacitor.

8. An LED lamp, comprising:

a) a lamp holder;

b) a housing, the housing comprising a wall, a chamber, and an opening; and the wall comprising a plurality of first air vents;

c) a lamp house, the lamp house comprising a vent hole assembly;

d) a power supply assembly;

e) an LED light source assembly;

f) a heat radiation assembly; and g) a clamping plate;

wherein:

the lamp holder is fixedly connected to the housing;

the power supply assembly is disposed in the chamber;

the LED light source assembly and the heat radiation assembly are disposed in the lamp house;

the clamping plate is disposed between the power supply assembly and the lamp house, and the lamp house is connected to the opening via the clamping plate; and the lamp holder is an E39-type lamp holder.

9. The lamp of claim 3, wherein the LED light source assembly comprises a COB (Chip-On-Board) light source and a lens; the lens is fixed on a top end surface of the COB light source, and a bottom of the COB light source leans against a top end surface of the heat pipe radiator.

* * * * *